(12) United States Patent
Soemo et al.

(10) Patent No.: US 7,155,499 B2
(45) Date of Patent: Dec. 26, 2006

(54) SYSTEM CONTROLLER FOR CONTROLLING A CONTROL NETWORK HAVING AN OPEN COMMUNICATION PROTOCOL VIA PROPRIETARY COMMUNICATION

(75) Inventors: Michael Soemo, Lombard, IL (US); Pierre DeSmul, Wilmette, IL (US); Robert Johnson, Vernon Hills, IL (US); Mark Gagner, West Chicago, IL (US); Geoffrey D. Nass, Schaumburg, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 684 days.

(21) Appl. No.: 09/967,849

(22) Filed: Sep. 28, 2001

(65) Prior Publication Data
US 2003/0074433 A1 Apr. 17, 2003

(51) Int. Cl.
*G06F 15/173* (2006.01)
(52) U.S. Cl. .................. 709/223; 709/220; 709/221; 709/226; 340/870.02; 700/19; 700/26
(58) Field of Classification Search ................ 709/223, 709/224; 700/20
See application file for complete search history.

(56) References Cited

U.S. PATENT DOCUMENTS

| | | | | |
|---|---|---|---|---|
| 5,923,269 | A * | 7/1999 | Shuey et al. ............. 340/870.02 |
| 5,923,557 | A * | 7/1999 | Eidson ........................ 700/129 |
| 6,047,219 | A * | 4/2000 | Eidson ........................... 700/2 |
| 6,100,817 | A * | 8/2000 | Mason et al. ........... 340/870.02 |
| 6,185,566 | B1 | 2/2001 | Adams et al. ................. 707/10 |
| 6,223,182 | B1 | 4/2001 | Agarwal et al. ............. 707/102 |
| 6,249,844 | B1 | 6/2001 | Schloss et al. .............. 711/122 |
| 6,285,912 | B1 * | 9/2001 | Ellison et al. ................. 700/11 |
| 6,405,103 | B1 * | 6/2002 | Ryan et al. .................. 700/275 |
| 6,445,961 | B1 * | 9/2002 | Melvin ......................... 700/32 |
| 6,457,021 | B1 | 9/2002 | Berkowitz et al. .......... 707/201 |
| 6,487,457 | B1 * | 11/2002 | Hull et al. ..................... 700/17 |
| 6,523,036 | B1 | 2/2003 | Hickman et al. ............. 707/10 |
| 6,647,317 | B1 * | 11/2003 | Takai et al. ................. 700/276 |
| 6,763,040 | B1 * | 7/2004 | Hite et al. ................... 370/522 |
| 6,832,120 | B1 * | 12/2004 | Frank et al. .................. 700/65 |
| 2002/0016639 | A1 * | 2/2002 | Smith et al. .................... 700/9 |
| 2002/0068984 | A1 * | 6/2002 | Alexander et al. ............ 700/17 |
| 2002/0152298 | A1 * | 10/2002 | Kikta et al. ................. 709/223 |
| 2004/0054829 | A1 * | 3/2004 | White et al. ................. 710/105 |

* cited by examiner

*Primary Examiner*—Bunjob Jaroenchonwanit
*Assistant Examiner*—Dohm Chankong

(57) ABSTRACT

A system controller is adapted to be integrated into a control network including a plurality of device controllers that communicate through the network via a network specific communication protocol for controlling a plurality of network devices. The system controller includes an application controller which is adapted to be connected to the network and stores a plurality of system points corresponding to a plurality of system variables relating to the network devices. The application controller is adapted to convert the system points into the corresponding system variables, and the corresponding system variables into the system points. At least one client is connected to the network and in communication with the application controller. The client is adapted to send a command and request a report relating to a select system point to and from the application controller. In operation, the application controller sends a command relating to a system variable corresponding to the select system point to the network responsive to the command from the client. The application controller also receives a report relating to the system variable corresponding to the select system point from the network, converts the received report to the report relating to the select system point and sends the converted report to the client responsive to the report request from the client.

23 Claims, 16 Drawing Sheets

| NAME | PUID | VUID | SV ADDRESS | OVER ENABLE | SVT | WRITABLE |
|---|---|---|---|---|---|---|
| Office 1 Temp | 33554496 | 218 | 37683212 | 1 | 105 | 1 |
| Office 2 Temp | 33554497 | 219 | 37683213 | 1 | 105 | 1 |
| Office 1 Occupancy | 33554498 | 220 | 37683214 | 1 | 128 | 1 |
| Office 1 Occupant | 33554499 | 221 | 37683125 | 0 | 36 | 0 |

| DEF POLL CYCLE | PWR FAIL ACT | QUALITY | WRT PRIORITY | OVRD PRIORITY |
|---|---|---|---|---|
| 60 | 0 | 192 | 0 | 0 |
| 60 | 0 | 192 | 0 | 0 |
| 60 | 1 | 192 | 64 | 0 |
| 120 | 0 | 192 | 0 | 0 |

FIG. 5

| PUID | ELEMENT | SPT | DEF COV LIMIT | SEC VALUE |
|---|---|---|---|---|
| 33554496 | 1 | 130 | 2 | 72.35 |
| 33554497 | 1 | 102 | 0 | 0 |
| 33554498 | 2 | 102 | 0 | 1.0 |
| 33554498 | 3 | 159 | 0 | 200.0 |

FIG. 6

| PUID | ELEMENT | STRING VALUE |
|---|---|---|
| 33554499 | 1 | "G.D. NASS" |

FIG. 7

SYSTEM CONTROLLER FOR CONTROLLING A CONTROL NETWORK HAVING AN OPEN COMMUNICATION PROTOCOL VIA PROPRIETARY COMMUNICATION

BACKGROUND

The present invention generally relates to system controllers for a network control system, and more particularly to a system controller which is adapted to control a system having a network with an open communication protocol via proprietary communication.

It is known in the control systems industry, especially the building control systems, to employ a control network to allow various system components to communicate with each other. Until recently, communication between the components in the network was through proprietary protocols developed by the control network developers/manufacturers. Increasingly, however, the control networks are now being implemented with open communication standards such as LonTalk® and BACnet. These communication protocols permit system components that are produced by different manufacturer to communicate with each other, thus providing the network designers the flexibility to choose system components from various sources.

Known control systems typically include one or more system controllers that are connected to device controllers that operatively control network devices. The system controller typically transmits commands to the device controllers for operating the network devices, and also receives data from the device controllers regarding status and other information about the network devices that may be of interest to the system controller for making decisions.

A problem associated with the known control system arrangements is that the communication between the system controller and the device controllers must be conducted via the open protocol of the system network. These protocols do not always have the capacity to provide the support necessary for implementing complex and increased functionalities required by some control systems such as a Heating/Ventilation/Air Conditioning (HVAC) system, for example. Known control system arrangements also limit designers' creativity in solving problems or expanding the capabilities of the system controller, because the designers are confined to the protocol of and the type of data provided by the network in place. Addition of new control applications to the control system is also complicated for the same reasons.

SUMMARY

The system greatly expands the functional capabilities of standard open protocols such as LONtalk® by embedding other complex functionality within the standard protocol.

DESCRIPTION OF THE DRAWINGS

FIGS. 5–7 are tables showing the arrangements of the system points in the database of the present invention;

DETAILED DESCRIPTION

Figure 1:
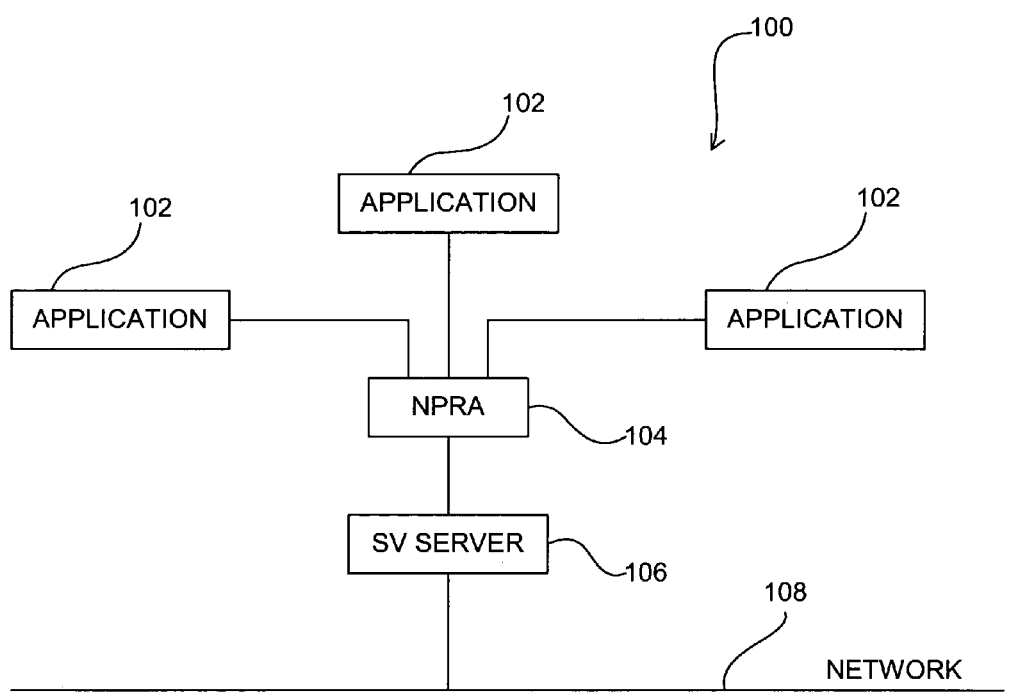
FIG. 1 is a logical block diagram of a system controller embodying the present invention, shown connected to a control network.

The present invention is directed to a system controller for controlling device controllers in a control system built around a network utilizing a network specific communication data format and protocol. The system includes a plurality of applications or programs for performing various tasks in the control system. An application controller is provided to facilitate transfer of data and other functions required by the applications in the system. Communication between the system application and the application controller is conducted via proprietary means, thereby allowing the system to migrate to different control network technologies without affecting the basic architecture between the system applications and the application controller. The application controller includes a converter for converting data between a network recognized format and the format recognized by the system applications. While applicable to any control system built around a control network, the present invention is particularly suited for use in a HVAC system.

Broadly stated, the present invention is directed to a system controller which is adapted to be integrated into a control network including a plurality of device controllers that communicate through the network via a network specific communication protocol for controlling network devices. The system controller includes an application controller which is adapted to be connected to the network and stores a plurality of system points corresponding to system variables relating to the network devices. The application controller is adapted to convert the system points into the corresponding system variables, and the corresponding system variables into the system points. At least one client is connected to the network and in communication with the application controller, and is adapted to send a command and request a report relating to a select system point.

In operation, the application controller sends a command relating to a system variable corresponding to the select system point to the network responsive to the command from the client. The application controller also receives a report relating to the system variable corresponding to the select system point from the network, converts the received report to the report relating to the select system point and sends the converted report to the client responsive to the report request from the client.

The present invention is also directed to a method of isolating control applications of a system controller that is adapted to control a network employing a network specific communication protocol for communicating between a plurality of controllers for controlling network devices. The method includes establishing communication between clients for performing the control applications and an application controller via a proprietary protocol, operatively establishing a connection between the application controller and the network, and storing in the application controller a plurality of system points which correspond to system variables relating to the network devices. The method further includes obtaining data relating to a system variable on the network corresponding to a select system point requested by a client, converting the data relating to the select system variable to data relating to the select system point responsive to the request from the client, and providing the client access to the converted data.

Turning now to FIG. 1, the system controller of the present invention is indicated generally at 100 and includes a plurality of applications 102, which are in communication with a network point record application (NPRA) 104. A system variable (SV) server 106 is connected between the NPRA 104 and the control network 108 and serves as an interface between the NPRA and the network data flow. It should be noted that FIG. 1 is a logical (data flow) view of the system controller 100 and that, the SV server 106 and the applications 102 may reside at different locations along the network 108 from the NPRA 104. Also, the NPRA 104 and the other applications may communicate directly, bypassing the SV server 106.

Figure 2:
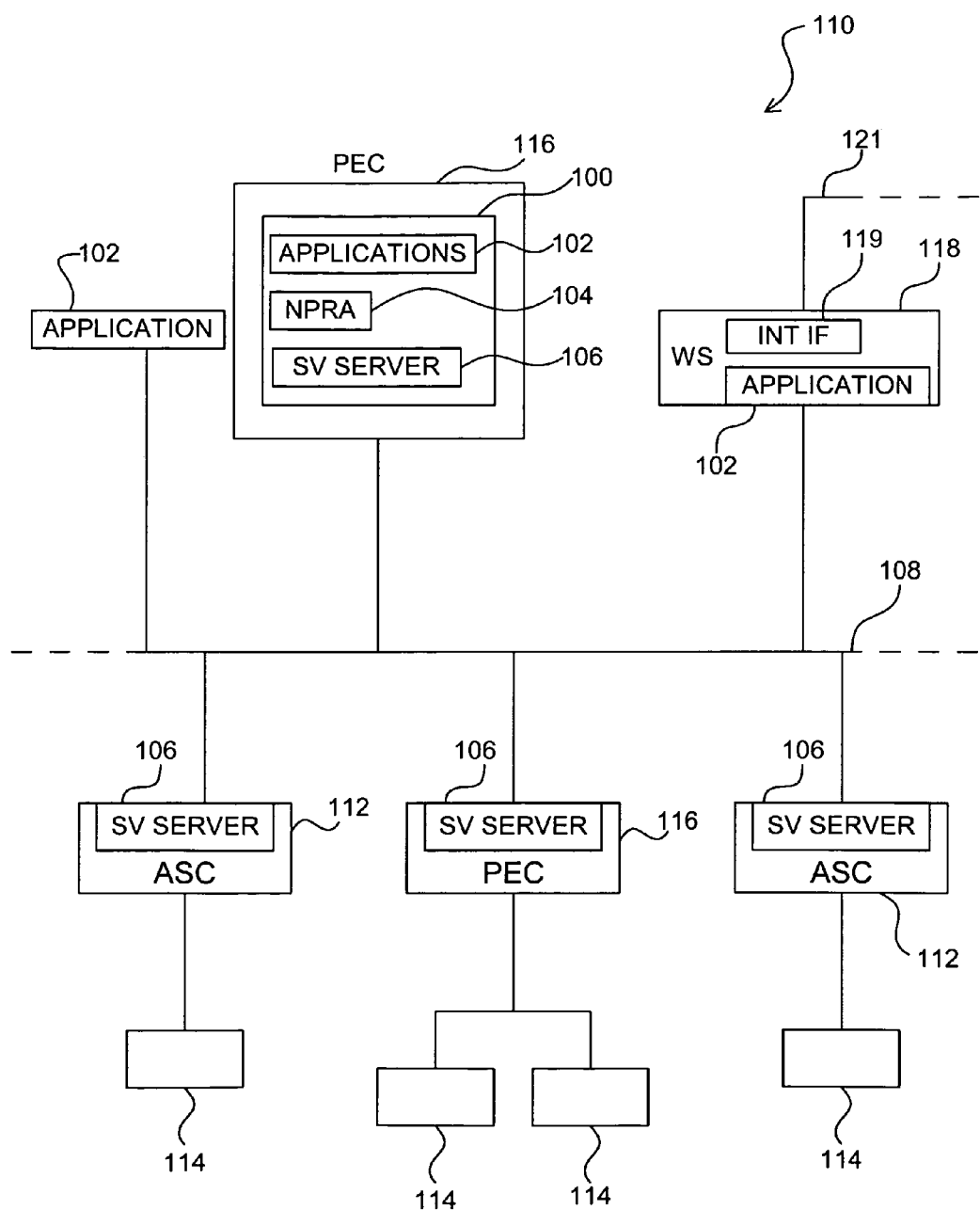
FIG. 2 is block diagram of the present system controller, shown incorporated into a control network.

In the preferred embodiment, the present invention is particularly adapted to be implemented in a building supervision and control system that includes a Heating/Ventilation/Air Conditioning (HVAC) system. As shown in FIG. 2, a control system 110 includes a plurality of device controllers that are network 108 compliant. They include an application specific controller (ASC) 112 (two shown) for controlling a number of physical devices 114, such as for example, a variable air volume (VAV) box that controls a fan for blowing hot or cold air into an area. Also included are a number of programmable equipment controllers (PEC) 116 (one shown), which also control physical devices 114 in the control system 110. In addition, the PECs 116 include features for enabling more sophisticated control processes, and generate data necessary for producing system reports. A workstation (WS) 118 allows a user of the control system 110 to input instructions to the device controllers 112, 116 for controlling the physical network devices 114, and gain access to the system data necessary for making decisions regarding the operation of the control system 110.

The WS 118, in the preferred embodiment, includes an internet interface 119 which allows the WS to be interfaced with the internet 121. A connection to the internet can be through an ethernet card or though a modem. Alternatively, an internet interface 119 can be provided in one of the PECs 116, in which case the connection mechanism to the internet would be hard coded into the PEC instead of using an ethernet card. In this manner, the operation of the control systems 110 can be controlled through the internet 121.

The applications 102 may be a part of the workstation 118 used to subscribe for changes in the status of the network devices 114, for example. They might also be a part of the PEC 116, such as an alarm detector for detecting and reporting alarm conditions to an operator, or a totalization application for totalizing and calculating power used by the network devices 114, or for calculating the total ON time for a device such as a fan. The NPRA 104 provides a means of data collection, translation, reporting, and updating from data sources on the network 108. The SV servers 106 facilitate transmission of system variables (SVs) from the device controllers 112, 116 to the NPRA 104, and data from the NPRA to the device controllers. The term system variables (SV) is defined to be values or data associated with the network devices 114 that are transmitted through the network via the network protocol, e.g., voltage from a sensor, a temperature reading, etc.

As shown in FIG. 2, the system controller 100 is preferably provided in the PEC 116 or the workstation 118. It should be understood, however, that the system controller 100 of the present invention may also be provided independently in a stand-alone unit. Each system controller 100 includes one NPRA 104, a plurality of applications 102 and one or more SV servers 106 which are incorporated into the device controllers 112, 116. Each ASC and PEC 112, 116 represents a "node" in the network 108, which is a logical location of the SV server 106. While only one system controller 100 is shown in FIG. 2, it should be understood that more than one system controller may be provided in the control system 110, where each system controller would be its responsible for controlling its designated nodes.

Figure 3:
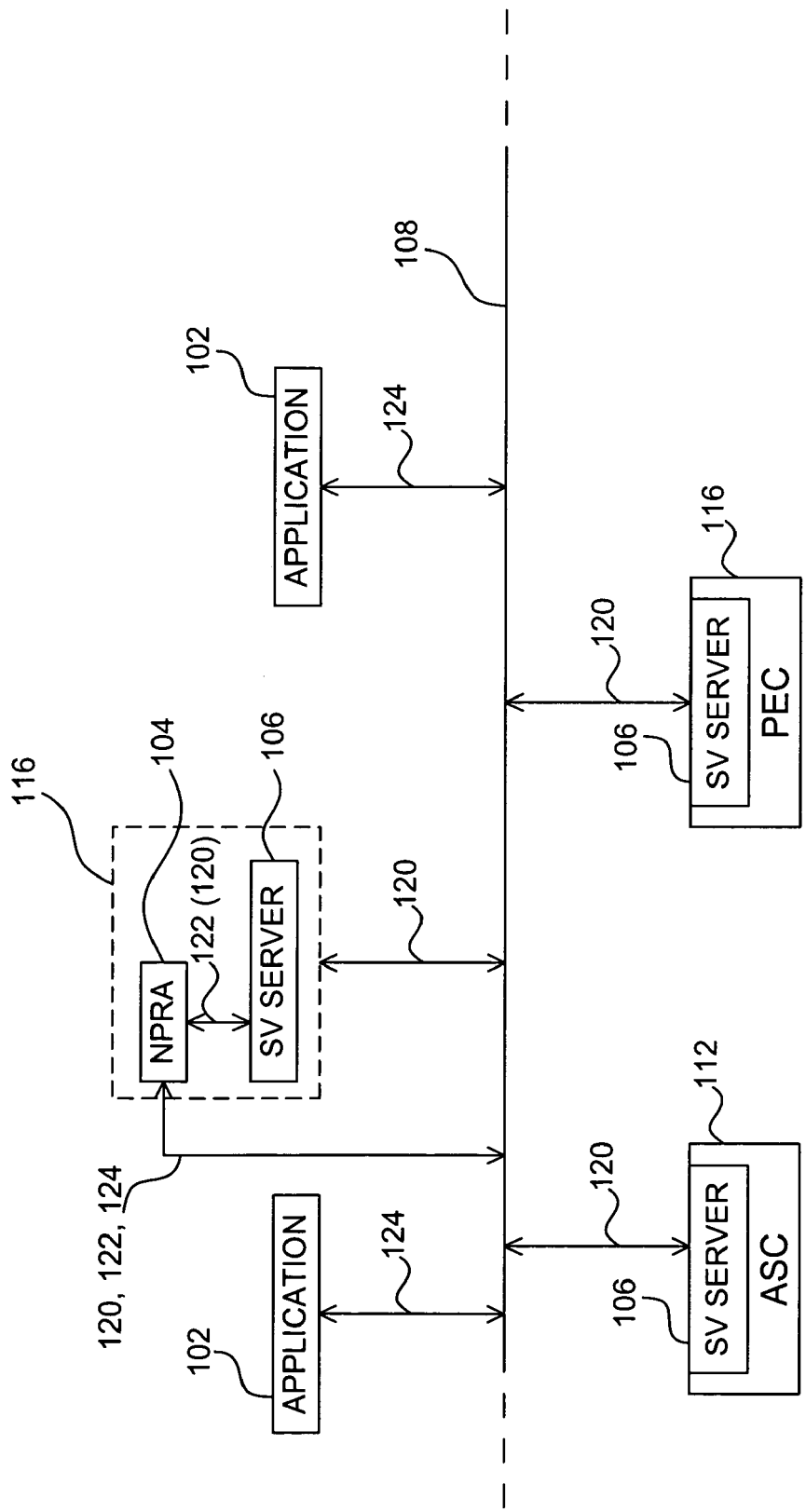
FIG. 3 is a logical block diagram illustrating the types of communication protocols employed in the present system controller.

Turning now to FIG. 3, communication between the device controllers 112, 116 at the physical level is through protocol 120 that is specific to the network 108 on which the system controller 100 is connected, for example, LonTalk® in a LON network. Data or system variables (SVs) that are transmitted between the SV servers 106 and the device controllers 112, 116 are in the format defined by the network protocol 120. Between the SV servers 106 and the NPRA 104, the format of the data being transmitted is the same as at the network level. Accordingly, the mechanism of the protocol 120 of the network 108 may be utilized in transmitting data, either through the local SV server 106 or directly between the NPRA 104 and the SV servers 106 in the other device controllers 112, 116 in the network 108. In the preferred embodiment, however, a proprietary communication protocol 122 may also be used to transmit data between the NPRA 104 and the SV servers 106, so as to provide a layer of abstraction between the network 108 and the NPRA. In other words, the proprietary protocol 122 used between the SV servers 106 and the NPRA 104 further isolates the system controller 100 from the network 108 so that the system controller is not bound to one particular control network. The proprietary protocol 122 at this level also allows the designer to implement additional capabilities in manipulating data or system variables. The preferred SV protocol 122 implemented between the NPRA 104 and the SV servers 106 is described in detail in a commonly assigned patent application entitled A PROPRIETRY PROTOCOL FOR COMMUNICATING NETWORK VARIABLES ON A CONTROL NETWORK, filed simultaneously herewith, and which is incorporated by reference in its entirety in the subject application.

In accordance with the present invention, a "system point" (SP) is assigned for each system variable (SV) on the network 108. A system point might represent a room temperature or a temperature setpoint measured or set by a thermostat (a network device 114 shown in FIG. 2), for example. Each SP has associated dynamic and static information which are organized into various data fields. When the system variables (SV) from the SV server 106 are received, the NPRA 104 converts or maps the SV into corresponding SPs. The SPs are communicated between the NPRA 104 and the applications 102 via a system point (SP) protocol 124. The SP protocol 124 is proprietary and described in detail in a commonly assigned patent application entitled A PROPRIETARY PROTOCOL FOR A SYSTEM CONTROLLER FOR CONTROLLING DEVICE CONTROLLERS ON A NETWORK HAVING AN OPEN COMMUNICATION PROTOCOL, filed simultaneously herewith, and which is incorporated by reference in its entirety in the subject application.

Figure 4:
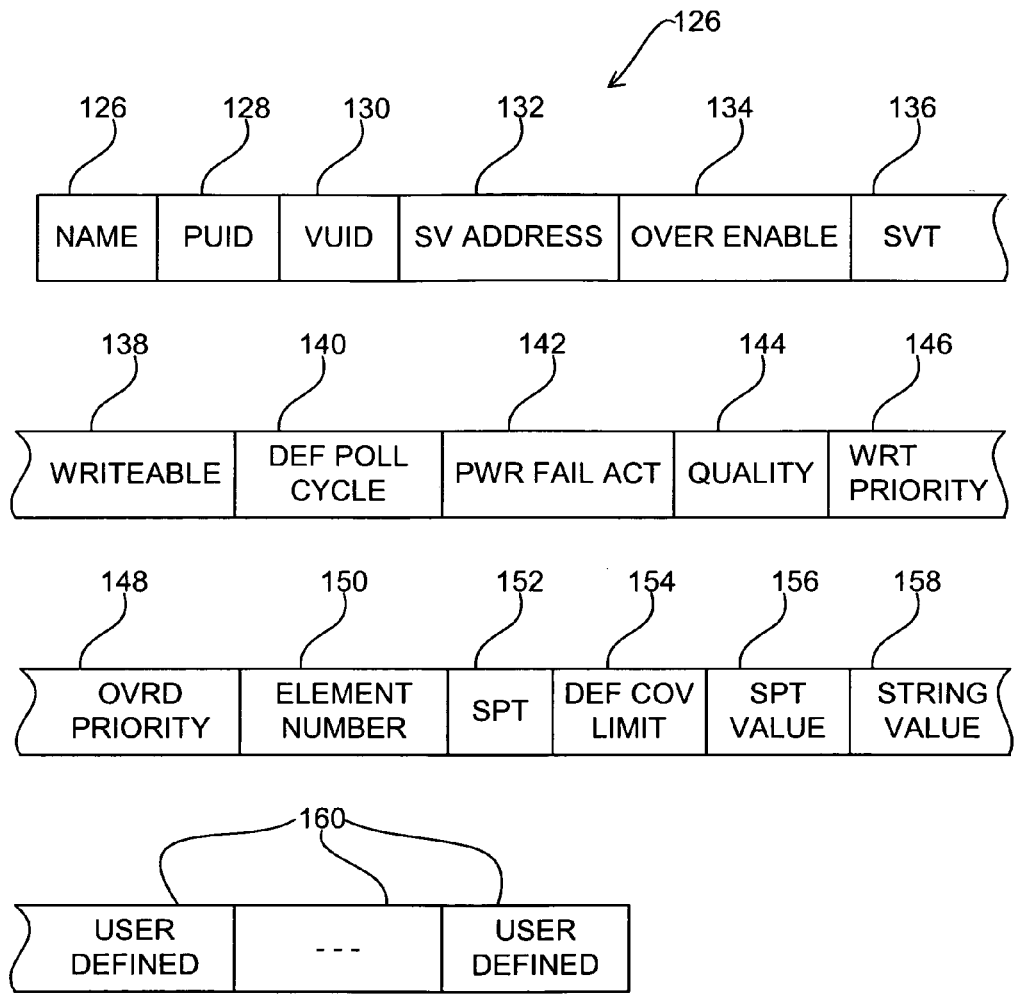
FIG. 4 is an illustration of the data fields associated with a single system point (SP), which is the data format employed in the present system controller.

Turning now to FIG. 4, a single SP 126 is shown and includes a plurality of fields which describe the characteristics of the SP. The fields of the SP 126 are described in TABLE 1 below (the number next to the field name corresponds to the reference numerals of FIG. 4).

The column named "Type" indicates the preferred number of bytes reserved for the corresponding fields. The first letter indicates whether the value is signed (S), unsigned (U) or a real number (R), and the following two numerals indicate the number of bits in the field. For example, the type "U08" represents an unsigned number having 8 bits (i.e., 0 to 255), and the type "S08" represents a signed number having 8 bits (i.e., −128 to +127). The S/D column indicates whether the field is static or dynamic. The static fields are not modified, while the dynamic fields may be modified.

The SPs includes one or more SP "elements." For example, one element of the SP could contain a state, while another element could contain the time until that state occurs. In the preferred embodiment, the data fields of the SPs in the system controller 100 are stored in separate database tables (see FIGS. 5–7) to avoid duplicating unnecessary fields. FIG. 5 shows a database table for storing data fields associated with all the SPs in the system controller 100, and FIG. 6 shows a database table storing the numeric elements of the SPs. As shown in FIG. 6, the database does not include all the fields shown in FIG. 5, but only those relating to the SP elements. FIG. 7 is another database table for storing the string elements of the SPs.

In accordance with the present invention, a system point type (SPT) (an engineering unit) is assigned to the SPs that require units, for example, SP values that represents temperatures, voltages, etc. The SPTs are derived from the seven base units defined by the National Institutes of Standards, and corresponds to types or units of the SPs associate with the SVs. The preferred SPTs for some of the categories of units are shown below in TABLE 2, which also include a column showing the corresponding type names used in the LON network, where applicable, as an example.

TABLE 1

| Field Name | Type | S/D | Description |
| --- | --- | --- | --- |
| Name 126 | Array of 36 U08's | S | User defined SP name. |
| PUID 128 | U32 | S | Unique ID number for the SP. |
| VUID 130 | U32 | S | Unique ID number for the SV associated with the SP. This field will be undefined if the SP is not associated with a SV. |
| SVAddress 132 | U32 | S | The logical address of the SV associated with the SP |
| Over Enable 134 | U08 | S | Indicates whether the SP can be overridden. |
| SVT 136 | U16 | S | The system variable type associated with the SP. |
| Writable 138 | U08 | S | This field defines if the SV corresponding to the SP can be written to. |
| DefPollCycle 140 | R32 | S | Default polling cycle for the SV associated with the SP. |
| PwrFailAct 142 | U08 | S | This field is valid on writeable points only. Describes the action that the NPRA 104 will take when the NPRA is powered-on. |
| Quality 144 | U16 | D | This field provides the quality of the SP's value to indicate the condition of the SV associated with the SP. |
| WrtPriority 146 | U08 | D | The current write priority value of the SP. |
| Ovrd Priority 148 | U08 | D | The current override priority value of the SP. |
| Element Number 150 | U08 | S | The identification number or index of the SP element. |
| SPT 152 | U16 | S | The type of the system point (engineering units). |
| Def COV Limit 154 | R32 | S | Default change of value limit for the SP element. |
| SP Numeric Value 156 | R32 | D | The current numeric value of an SP element in System Type (SPT) units. |
| SP String Value 158 | Array of 32 U08's | D | The current string value of an SP element in SPT units. |
| User Defined 160 | User defined | D or S | Additional fields for use in specific applications. |

TABLE 2

| Category | SPT | SVT Name |
| --- | --- | --- |
| Address | — | SNVT_Address |
| Alkalinity | PH | SNVT_ph_f |
| Angle | radians | SNVT_angle_f |
| Angular Velocity | Radians/sec | SNVT_angle_vel_f |
| Area | square_meters | SNVT_area |
| Degree Days | degree_days_Celsius | — |
| Density | kilograms per meter cubed | SNVT_density_f |
| Electrical Consumption | Joules | — |
| Electrical Current | Amperes | SNVT_amp_f |
| Electrical Power Factor | power_factor | SNVT_power_fact_f |
| Electrical Reactive | volt_amperes_reactive | — |
| Electrical VA | volt_amperes | — |
| Energy consump/Area | Joules per square meter | — |
| Energy per Area | watts_per_square_meter | — |
| Energy per time | Watts | SNVT_power_f |
| Energy per weight | joules per kilogram | — |
| Energy type | Enumeration-E51 | UNVT_energy_type |
| Enthalpy | Joules per kilogram dry air | — |
| Heat Capacity & Entropy | Joules per Kelvin | — |
| Specific Heat Capacity & Specific Entropy | Joules per kilogram degree Kelvin | — |
| Frequency | Hertz | SNVT_freq_f |
| Humidity | percent_relative_humidity | SNVT_lev_percent |
| Length | Meters | SNVT_length_f |
| Level, Percent | Percent | SNVT_lev_cont_f |
| Light. illuminance | lux | SNVT_lux |
| Light, luminosity | lumens | — |
| Mass | kilograms | SNVT_mass_kilo |
| Mass Flow | kilograms_per_second | — |
| Power | Watts | SNVT_power_f |

TABLE 2-continued

| Category | SPT | SVT Name |
|---|---|---|
| Pressure | pascal | SNVT_press_f |
| Resistance | Ohms | SNVT_res_f |
| Sound level | Decibels | SNVT_sound_db_f |
| Sound level, delta | decibels | SNVT_sound_db |
| Substance | Moles | — |
| Temp, Measure | Kelvin | — |
| Temp, Differential | K delta | — |
| Temp, Rate of Change | K per second | — |
| Thermal Energy | Joules | — |
| Thermostat mode | Enumeration-E46 | SNVT_therm_mode |
| Time/date, year | year | SNVT_time_stamp |
| Time/date, month | month | SNVT_time_stamp |
| Time/date, day | day | SNVT_time_stamp |
| Time/date, hour | hour | SNVT_time_stamp |
| Time/date, minute | minute | SNVT_time_stamp |
| Time/date, second | Second | SNVT_time_stamp |
| Time, Elapsed | Second | SNVT_time_f |
| Velocity | Meters per second | SNVT_speed_f |
| Voltage | Volts | SNVT_volt_f |
| Volumetric Flow | cubic meters per second | — |
| Volume | cubic_meters | |
| Other | Watts per sq meter Kelvin | — |

It should be noted that the above-mentioned SP protocol 124 and the SV protocol (if employed) are preferably embedded into the protocol 120 of the network. In the LONTalk® protocol, for example, the SP and the SV protocols would be incorporated into the "explict messages" fields specifically designated for incorporation of proprietary communication messages.

Figure 8:
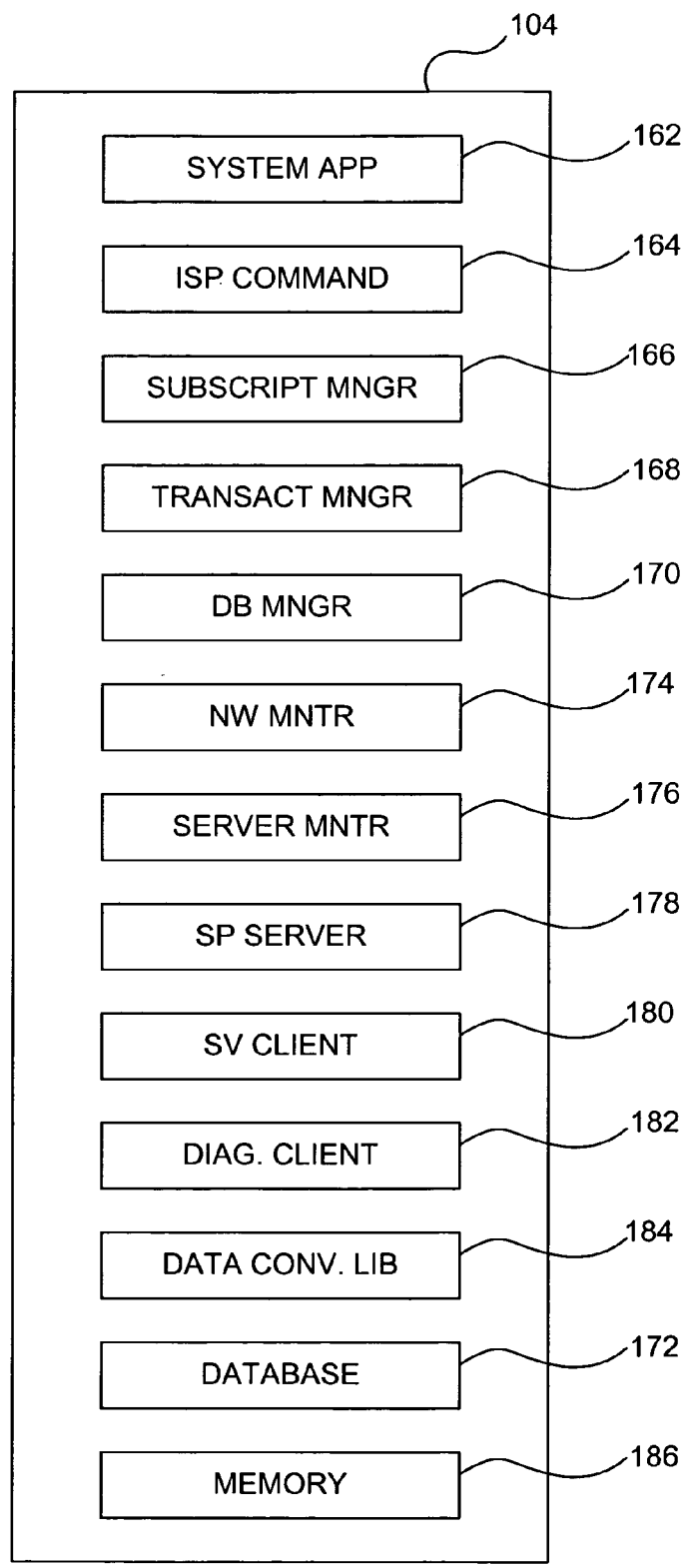
FIG. 8 is a logical block diagram of a network point record application (NPRA) of the present invention.

Turning now to FIG. 8, the NPRA 104 is written preferably in C++ programming language using object-oriented programming techniques, and includes a system application 162 which manages the startup and shutdown of the NPRA. A point commander 164 manages the writing and overriding of the SPs as well as the SV's corresponding to the SPs. A subscription manager 166 manages the reporting of predetermined events relating to or changes in the status of the SPs to the applications 102 that subscribe for these events. The subscription manager 166 also manages the reporting of general events which are not predetermined, such as a failure in the network device controllers 112, 116.

A transaction manager 168 manages the transactions performed by the NPRA 104 in processing the operations requested by the various applications 102. A database manager 170 manages the access to the embedded database 172 that stores the SPs. A network monitor 174 monitors the status of the device controllers (ASCs 112 and PEC 116) in the network 108 that are operatively connected to the NPRA 104. The network monitor 174 is adapted to detect when network device controllers 112, 116 have failed or returned from failure, and generate an event to inform the subscribed applications 102. A server monitor 176 monitors the status of the SV servers 106 that are associated with the NPRA 104.

A system point (SP) server 178 provides message processing (including report generation) between the NPRA 104 and the applications 102 that are operatively connected to the NPRA. The NPRA 104 further includes an SV client 180 for processing messages transmitted between the NPRA 104 and the SV servers 106. A diagnostics client 182 is included to provide diagnostics information regarding the device controllers 112, 116 on the network 108, e.g., the logical address, set time, memory size, etc. A data conversion library 184 provides the ability to convert between SVs and SPs.

The database 172 stores all the SPs supported by the system controller 100, and memory 186 provides the cache functions for all data processed by the NPRA 104 during operation, including the data stored in the database 172 for faster operation. The memory 186 is preferably a RAM and/or a Flash ROM.

Figure 9:
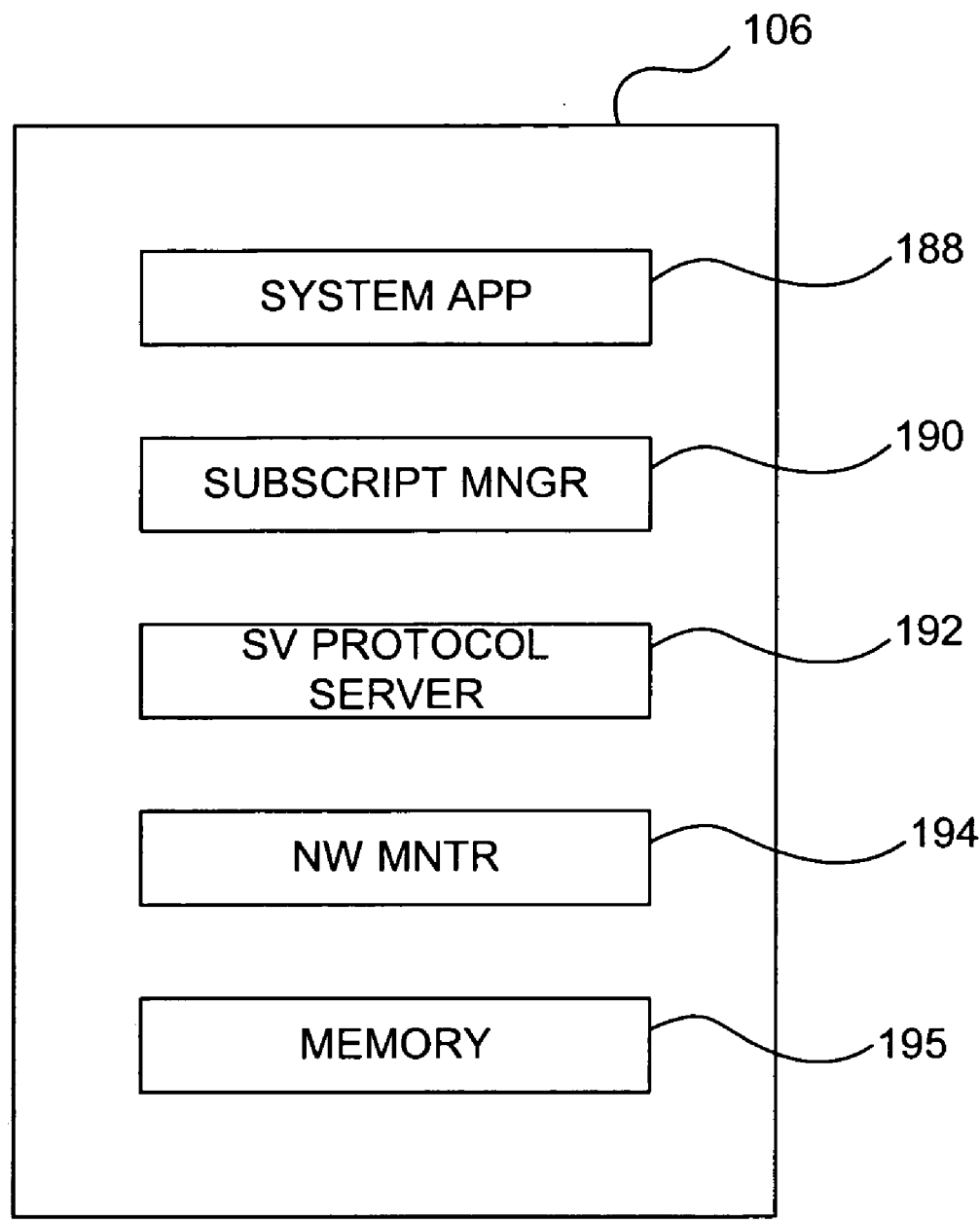
FIG. 9 a logical block diagram of a system variable (SV) server of the present invention.

Turning now to FIG. 9, the SV server 106 is written preferably in the C++ programming language using object-oriented programming techniques, and includes a system application 188 that manages the startup and shutdown of the SV server. A subscription manager 190 keeps track of the applications 102 that are subscribed for the SVs of the corresponding SV server 106, and the SVs that are currently overridden at the same SV server. In the preferred embodiment, an SV protocol server 192 is provided in the SV server 106 for decoding messages from the NPRA 104 sent via the SV protocol 122 (described above with FIG. 3), and sending report messages back to the NPRA via the SV protocol 122.

A network client 194 provides an interface to both sending and receiving messages sent via the network protocol 120 across the control network 108, including the explicit messages that contain the proprietary communications messages, including the SV protocol messages. The network client 194 also processes network management messages such as node queries, SV writes, SV polls, etc. (described below) as directed by the NPRA 104. A memory 195 is preferably a RAM and/or a Flash ROM for storing information necessary to perform the tasks associated with the components of the SV server 106.

Figure 10:
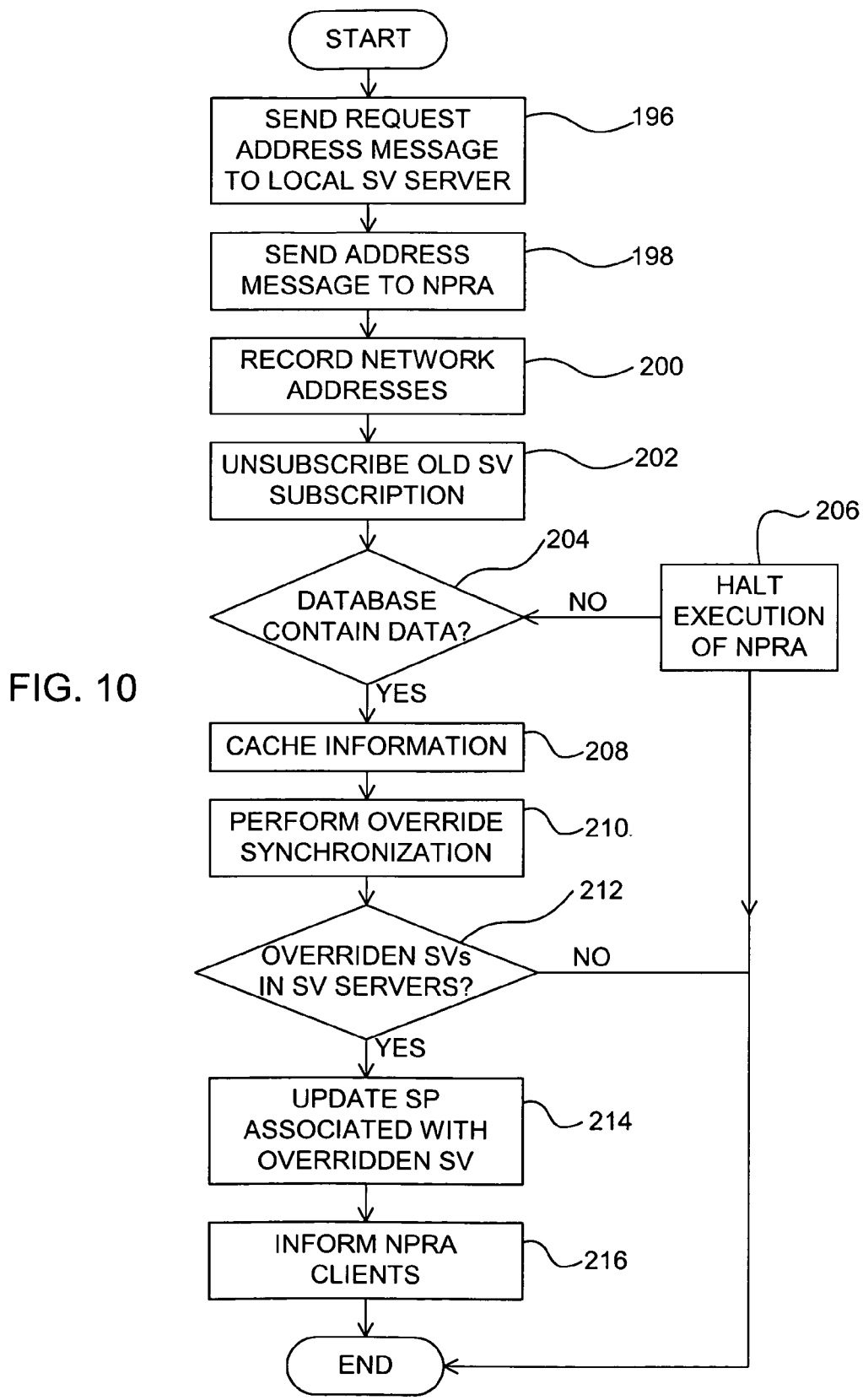
FIG. 10 is a flowchart illustrating the startup operation of the NPRA shown in FIG. 8.

Turning now to FIG. 10, the startup operation of the NPRA 104 occurs automatically when a network device controller (e.g., a PEC 116) containing the NPRA is powered ON. The startup operation of the NPRA 104 can also occur when an NPRA "client" such as the workstation 118 commands the NPRA to start running (from a suspended state). The term "client" is defined to mean the applications 102 that "subscribe" to the NPRA 104, as discussed below, and is used interchangeably with applications 102 where appropriate.

At the start, the system application 162 invokes the diagnostics client 182 to determine the logical network address of the device controller 116 or 118 containing the NPRA 104. In response, diagnostics client 182 sends a message to the local system variable (SV) server 106 in the same controllers 116 or 118 containing the NPRA 104, requesting its address (block 196). The SV server 106 replies with a message containing the network address of the node to which it belongs (block 198). The diagnostics client 182 receives the address and records it in the NPRA memory 186 (block 200).

The system application 162 then broadcasts a message to the SV servers 106 in the network 108 to cancel any existing subscriptions for SVs that the NPRA 104 may have with the SV servers (block 202). The details of the process for establishing an SV subscription are described below. The system application 162 also invokes the database manager 170 to determine if the NPRA database 172 contains any data (block 204). If not, the system application 162 suspends execution of the NPRA 104, and the startup operation is ended (block 206). If present, the database manager 170 caches the data into the memory 186 from the NPRA database 172 for use during operations requiring the data (block 208).

The system application 162 then invokes the subscription manager 166, which in turn invokes the transaction manager 168, to perform an override synchronization to determine if any of the SVs corresponding to the SPs stored in the NPRA database 172 had been overridden prior to the NPRA 104 being powered ON (block 210). To accomplish this task, the transaction manager 168 sends a report request message to each of the SV servers 106 that are cooperatively connected to the NPRA 104 to determine if any of the SV servers had overridden SVs (block 212). If the SV server 106 does have overridden SVs, it sends an SV report back to the NPRA's SV client 180. The transaction manager then invokes the database manager 170 to update each SP that is associated with the overridden SV (block 214). The database manager 170 then informs the subscription manager 166 that the SP has been updated. Then the subscription manager 166 informs each of the NPRA clients 102 that is subscribed to the specific SP (as described in detail below) of the update to the SP (block 216), and the startup operation is concluded. If at block 212, no SV has been overridden, the startup operation ends at this point.

Figure 11:
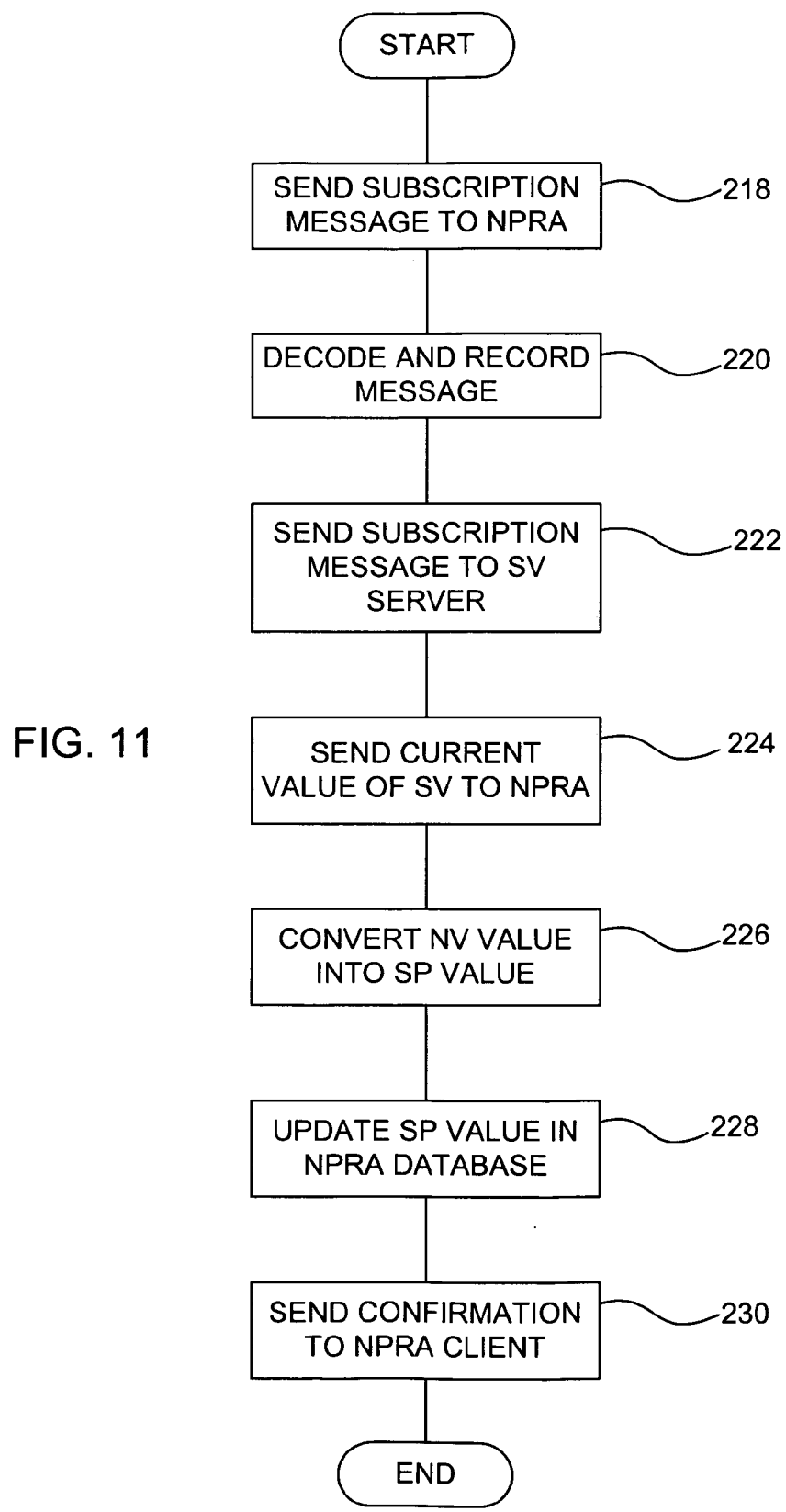
FIG. 11 is a flowchart illustrating the manner in which applications in the present system controller subscribe for system points (SP) in the control system.

Turning to FIG. 11, the NPRA 104 provides the NPRA clients 102 with a means of selectively subscribing for changes or particular events associated with the SPs (for example, a change in the value of the SP), for predetermined or undetermined reasons. The subscription process begins with the NPRA client 102 sending a message to the NPRA 104 to subscribe for particular events on a specified SP (block 218). When the message is received, the SP server 178 decodes the message, and passes the subscription request on to the subscription manager 166, which records the subscription and passes the subscription request on to the transaction manager 168 (block 220). The transaction manager 168 then sends a subscription message to the SV server 106 that contains the SV that is mapped to the SP for which the subscription is being made (block 222). In response, the SV server 106 replies with a report message that confirms the subscription and contains the current value of the SV (block 224).

Upon receiving the message, the SV client 180 informs the transaction manager 168, which invokes the data conversion library 184 to convert the SV value into a SP value (block 226). The data conversion library 184 then passes the SP value to the database manager 170, which updates the SP value in the NPRA database 172 (block 228). The database manager 170 then informs subscription manager 166 of the update to the SP's value. In turn, the subscription manager 166 informs the SP server 178 to send a message containing the current SP value back to the subscribing NPRA client 102 as a subscription confirmation (block 230).

Figure 12:
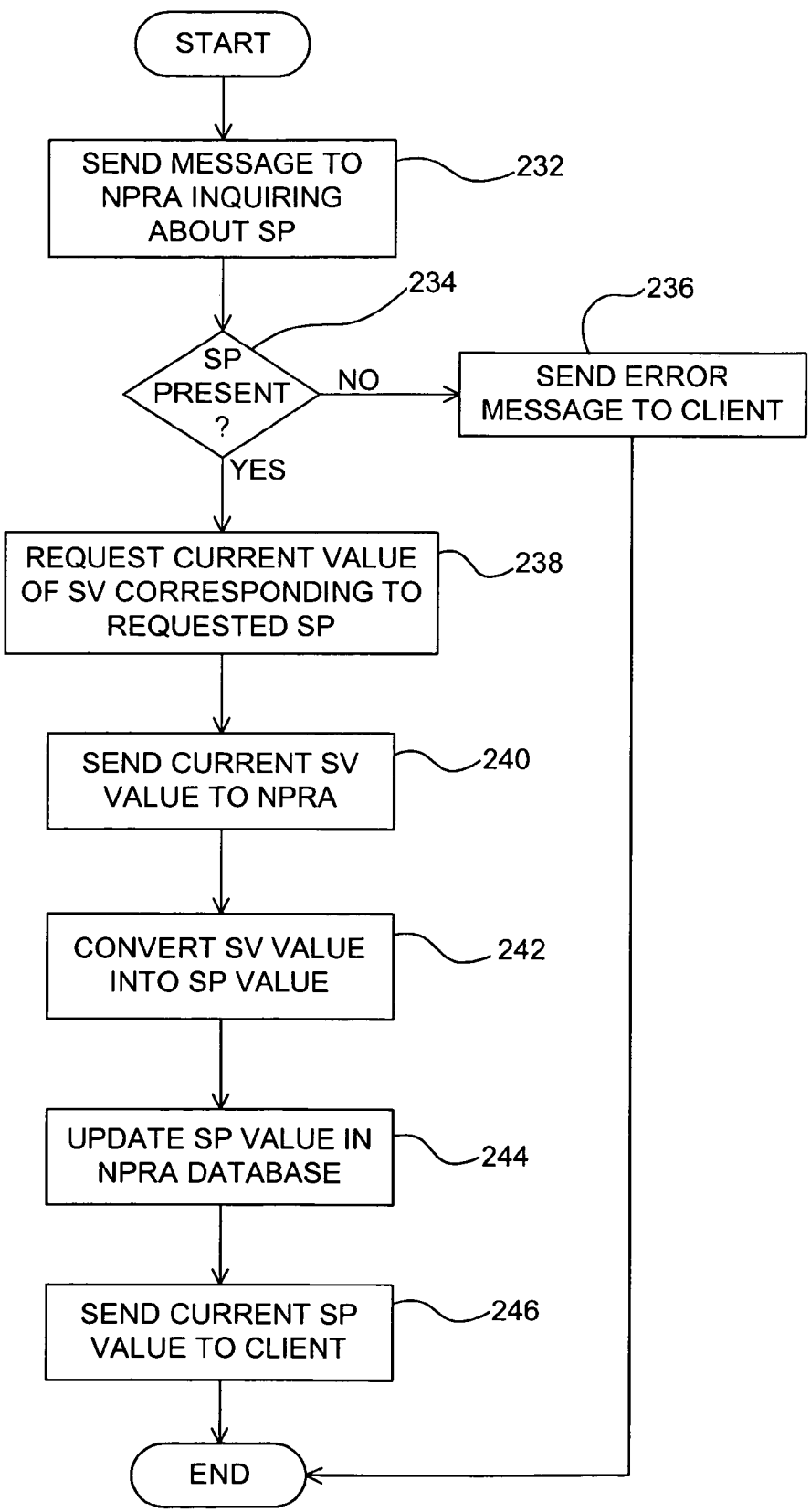
FIG. 12 is a flowchart illustrating the manner in which the applications in the system controller query for the system points in the control system.

Referring to FIG. 12, the means by which the NPRA 104 allows the NPRA clients 102 to query the NPRA for information on specific SPs stored in the NPRA database 172 is described. At the start, the NPRA client 102 sends a message to the NPRA 104 to request the current value of the SP (block 232). The SP server 178 decodes the message, and if the SP is not present at the NPRA 104 (block 234), sends an error message back to the SP client (block 236). If the SP is present at the NPRA 104 (block 234), the SP server 178 passes the request on to the transaction manager 168. The transaction manager 168 then instructs the SV client 180 to send a message to the SV server 106 containing the SV that is mapped to this SP, to request the current value of the SV (block 238). In response, the SV server 106 processes the message, retrieves the current value of the SV, and returns it in a message back to the SV client 180 (block 240). The SV client 180 then informs the transaction manager 168 that the transaction with the SV server 106 has been completed.

Next, the transaction manager 168 invokes the NPRA's data conversion library 184 to convert the SV value into the SP value (block 242). The converted SP value is passed to the database manager 170, which updates the SP value in the NPRA database 172 (block 244). The converted SP value is also passed to the SP server 178, which sends a report message containing the current SP value back to the querying NPRA client 102 (block 246).

Figure 13:
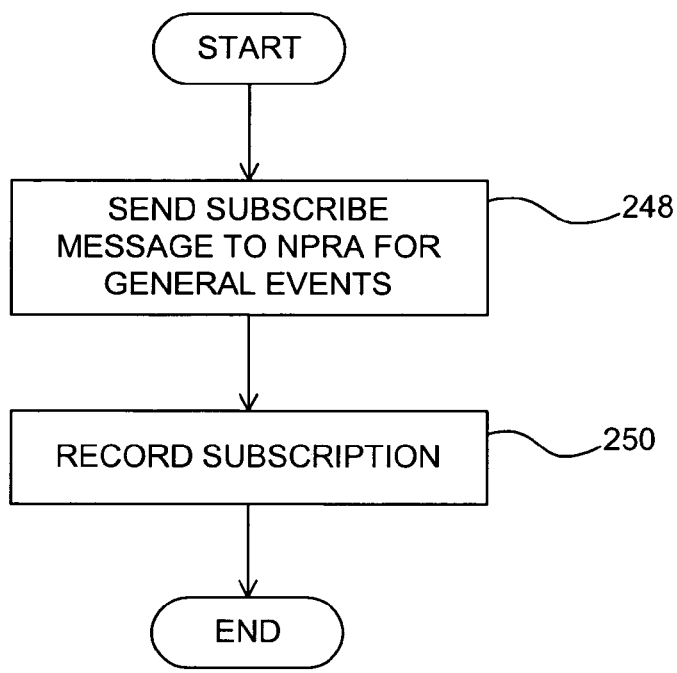
FIG. 13 is a flowchart illustrating the manner in which applications in the system controller subscribe for general events that may occur in the control system.

FIG. 13 describes the manner in which the NPRA clients 102 subscribe for general event notifications. The term "general event" is meant here to be an error condition occurring in the network device controllers 112, 116. In the preferred embodiment, the NPRA client 102 (for example, an application in the workstation 118) sends a message to the NPRA 104 to subscribe for general events that occur at or above a specific severity level (block 248). The SP server 178 decodes the message, and then passes the subscription request to the subscription manager 166, which records the subscription in the NPRA memory 186 (block 250).

Figure 14:
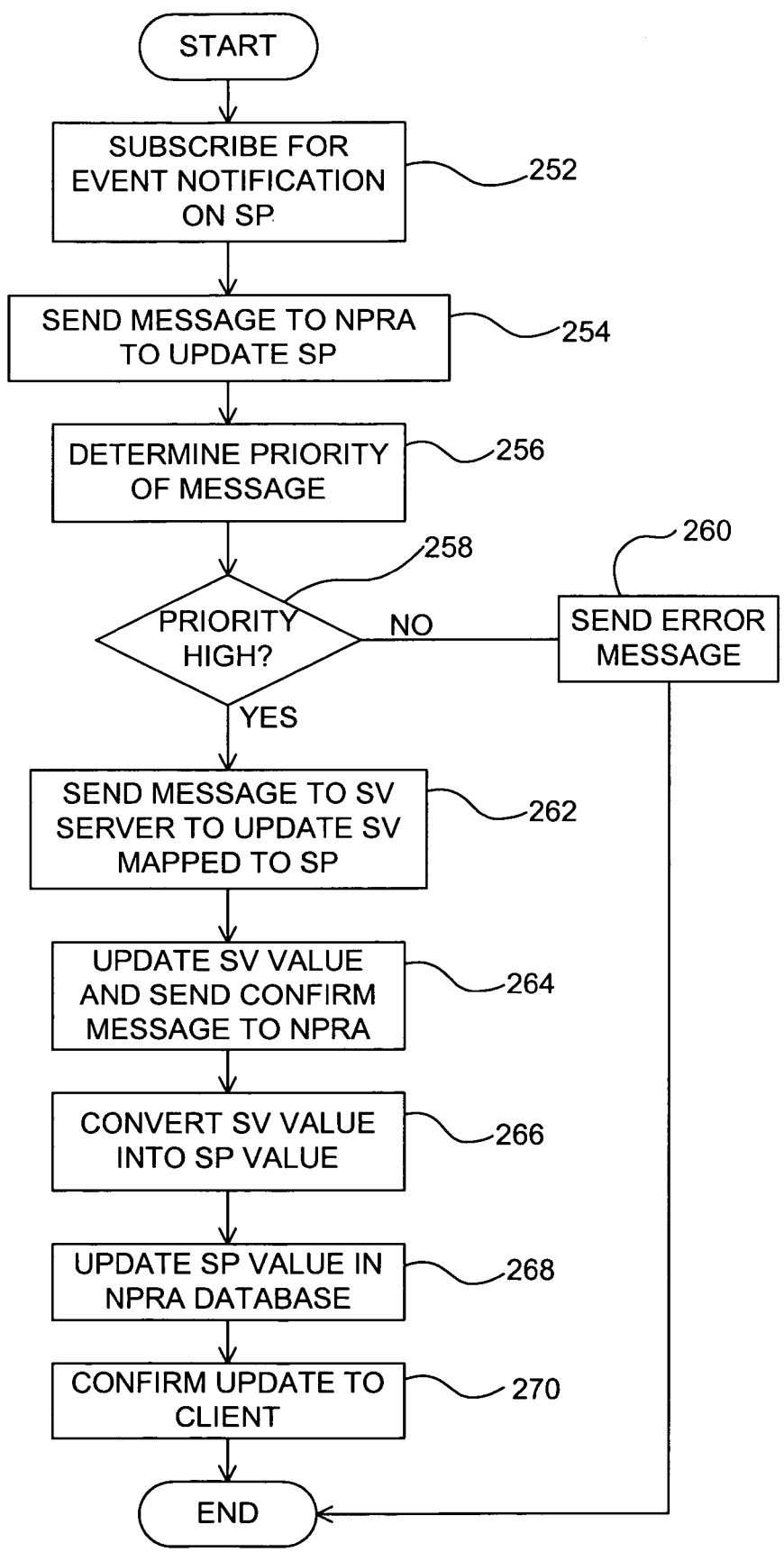
FIG. 14 is a flowchart illustrating the manner in which applications in the system controller update the system points in the control system.

FIG. 14 describes the manner in which the NPRA 104 provides the NPRA clients 102 with a means of updating the value of a specific SP at the NPRA 104. At the start, the NPRA client 102 (e.g., the workstation 118) executes the SP subscription processing (described above and shown in FIG. 11), to subscribe for event notifications on the SP, and to obtain the current value of the SP (block 252). The NPRA client 102 then sends a message to update the value of the specific SP at the NPRA 104 (block 254). Upon receipt, the SP server 178 decodes the message and determines the client's priority relative to the priority of the SP recorded in the priority fields of the SP (block 256). It should be noted that the SPs have two priority fields as shown in FIG. 4. The WRT PRIORITY field 146 stores the priority of a write operation which merely updates the value of the SP. The OVRD PRIORITY field 148 stores the priority of an override operation which is generally a higher priority operation than that of the write operation. The override operation overrides the existing value and also prevents other clients from changing the overridden value. The priority levels prevent the low priority NPRA clients 102 from overwriting or re-overriding the SP values set by the high priority NPRA clients. The term "updating" is meant here to describe the writing or the overriding operation.

If the NPRA client's priority is not higher than the priority recorded in the the priority field of SP (block 258), the SP server 178 ignores the message, and sends an error message back to the NPRA client 102 (block 260), and the update process is concluded. If, however, the priority is higher than the priority of the SP, the SP server 178 passes the request on to the SP commander 164, which passes the request to the transaction manager 168. The transaction manager 168 then sends an SV update message to the SV server 106 that contains the SV that is mapped to the SP being updated (block 262). In response, the SV server 106 updates the SV value, and replies with a report message that confirms the update (block 264). The SV client 180 receives this message, and informs the transaction manager 168 that the update transaction has been completed. The transaction manager 168 then invokes the data conversion library 184 to convert the SV value into an SP value (block 266).

The data conversion library 184 then passes the SP value to the database manager 170, which updates the SP value in the NPRA database 172 (block 268), and then informs the subscription manager 166 of the update to the SP's value.

Finally, the subscription manager 166 informs the SP server 178 to send a report message containing the current SP value back to the client 102 as an update confirmation (block 270). This concludes the update process.

Figure 15:
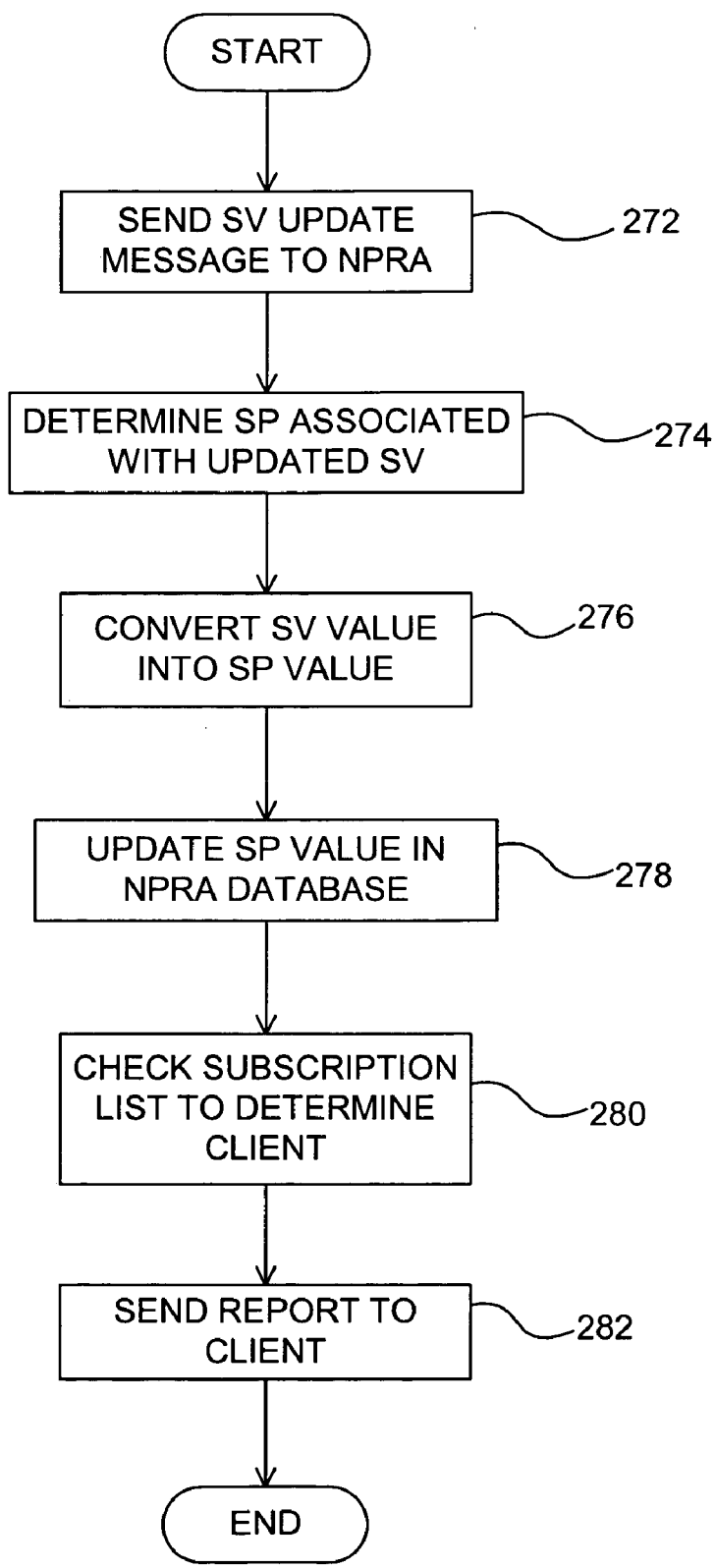
FIG. 15 is a flowchart illustrating the manner in which the NPRA processes SP events that may occur in the control system.

Turning now to FIG. 15, a description is given of the operation in which the NPRA 104 processes specific events that occur on a specific SP. An event occurs when an SV is changed or updated at the device controllers 112, 116 as a result of some occurrence in the network 108. If this SV is associated with an SP subscribed to by the NPRA 104 (as described above and shown in FIG. 14), the SV server 106 sends an update message to the Nora's SV client 180 (block 272), which passes the updated SV to the database manager 170. The database manager 170 determines the SP at the NPRA 104 that is associated with this SV (block 274), invokes the data conversion library 184 to convert the SV value into an SP value (block 276), and updates the SP's value in the Nora's database 172 (block 278). The database manager 170 then informs the subscription manager 166 that the SP value has been updated. The subscription manager 166 then checks its list of subscriptions to determine which NPRA clients 102 are subscribed for updates for this SP (block 280), and invokes the SP server 178 to send a report message to each NPRA client 102 that is subscribed to this SP (block 282).

Figure 16:
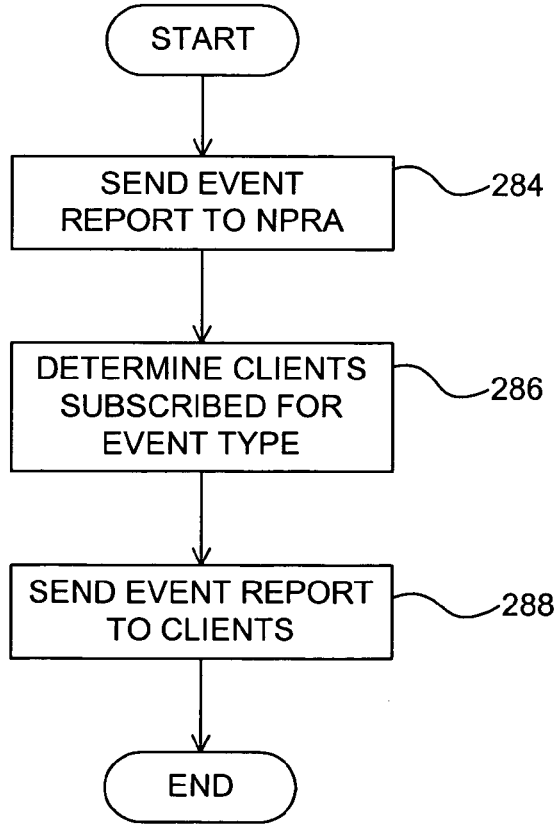
FIG. 16 is a flowchart illustrating the manner in which the NPRA processes general events that occur in the control system.

Turning now to FIG. 16, a description is given of the manner in which the NPRA 104 processes general events, which are error conditions that may occur in the applications 102 or on the network nodes 112, 116 in the network 108. When an NPRA client 102 detects an error condition in itself or in the nodes, it sends an event report message to the NPRA 104 (block 284). The SP server 178 decodes the message, and passes the event information on to the subscription manager 166, which determines the NPRA clients 102 that are subscribed for notification of this particular type of event (block 286). The subscription manager 166 then informs the SP server 178 to send a report to the subscribed NPRA clients 102 (block 288).

Figure 17:
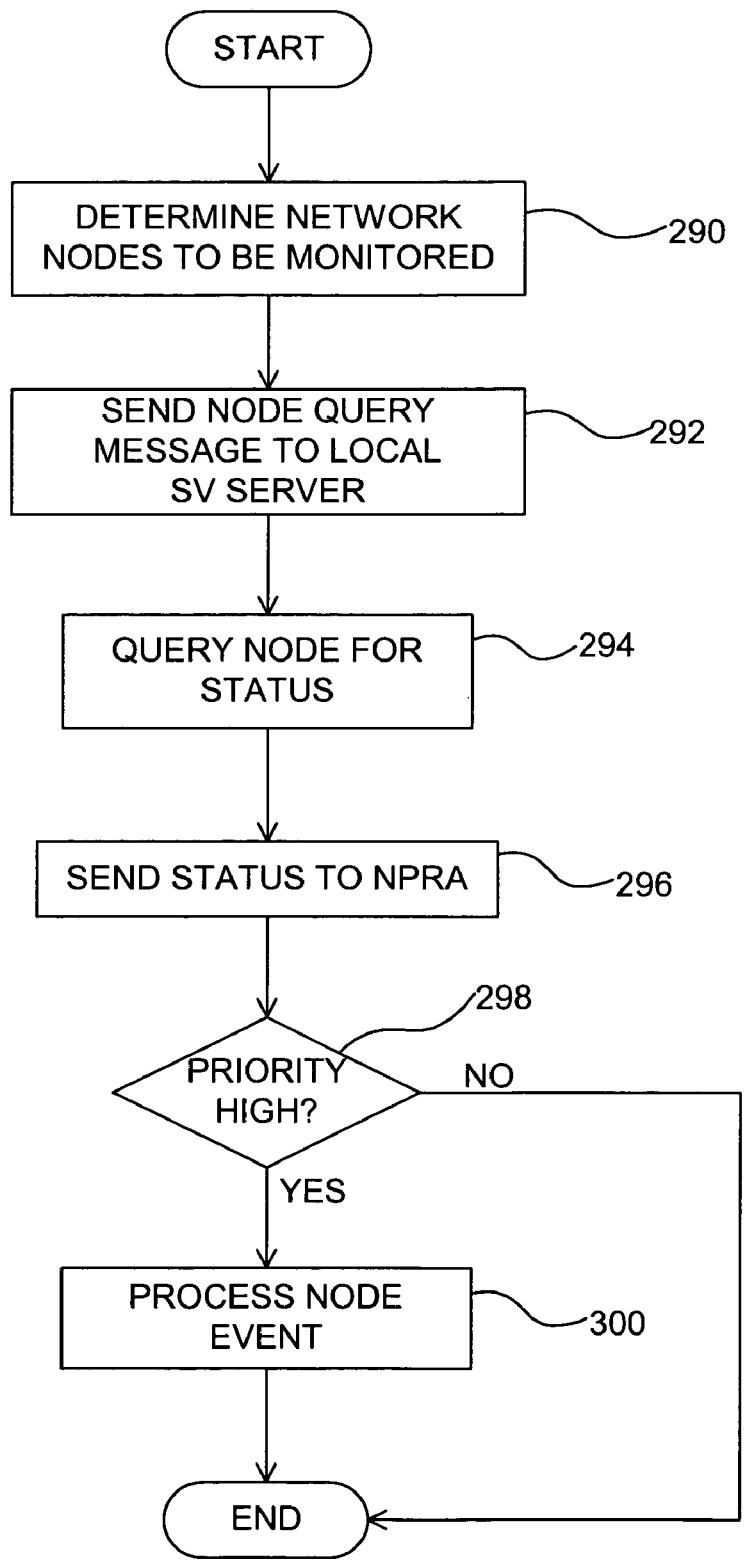
FIG. 17 is a flowchart illustrating the manner in which the NPRA monitors nodes that are connected to the NPRA in the control network.

In accordance with the invention, and referring to FIG. 17, the NPRA 104 is also responsible for monitoring the status (health) of the nodes (i.e., the controller devices 112, 116) in the network 108 with which the NPRA communicates (see FIG. 2). If a node is removed from the network 108, or its network connection is lost, the NPRA 104 and the NPRA clients 102 subscribed to the SIs at the SV server at this node are informed through this process. After the startup of the NPRA 104 is completed (described above together with FIG. 10), the system application 162 queries the database manager 170 for a list of the network nodes that are stored in the database 172, and then informs the network monitor 174 that these are network nodes that should be monitored or scanned (block 290). The network monitor 174 then starts scanning the network nodes on a periodic basis, for example, every 10 seconds. Scanning is conducted with the network monitor 174 invoking the transaction manager 168 to send a node query message to the local SV server 106, which query the specified network node using a standard network management message (block 294). Once the SV server 106 determines the remote node's status, it sends a node query response back to the NPRA 104 (block 296). The SV client 180 decodes this message, and passes the response back to the transaction manager 168, which informs the network monitor 174 of the status of the node. If the node's status is unchanged (block 298), the monitoring process comes to an end.

If, however, the node's status has gone from "OK" to "failed," the network monitor 174 invokes the subscription manager 166 to process a node fail event (described above together with FIG. 16). If the node's status has gone from "failed" to "OK," the network monitor 174 invokes the subscription manger 166 to process a node "return-from-failure" event (block 300), as described above together with FIG. 16.

Figure 18:
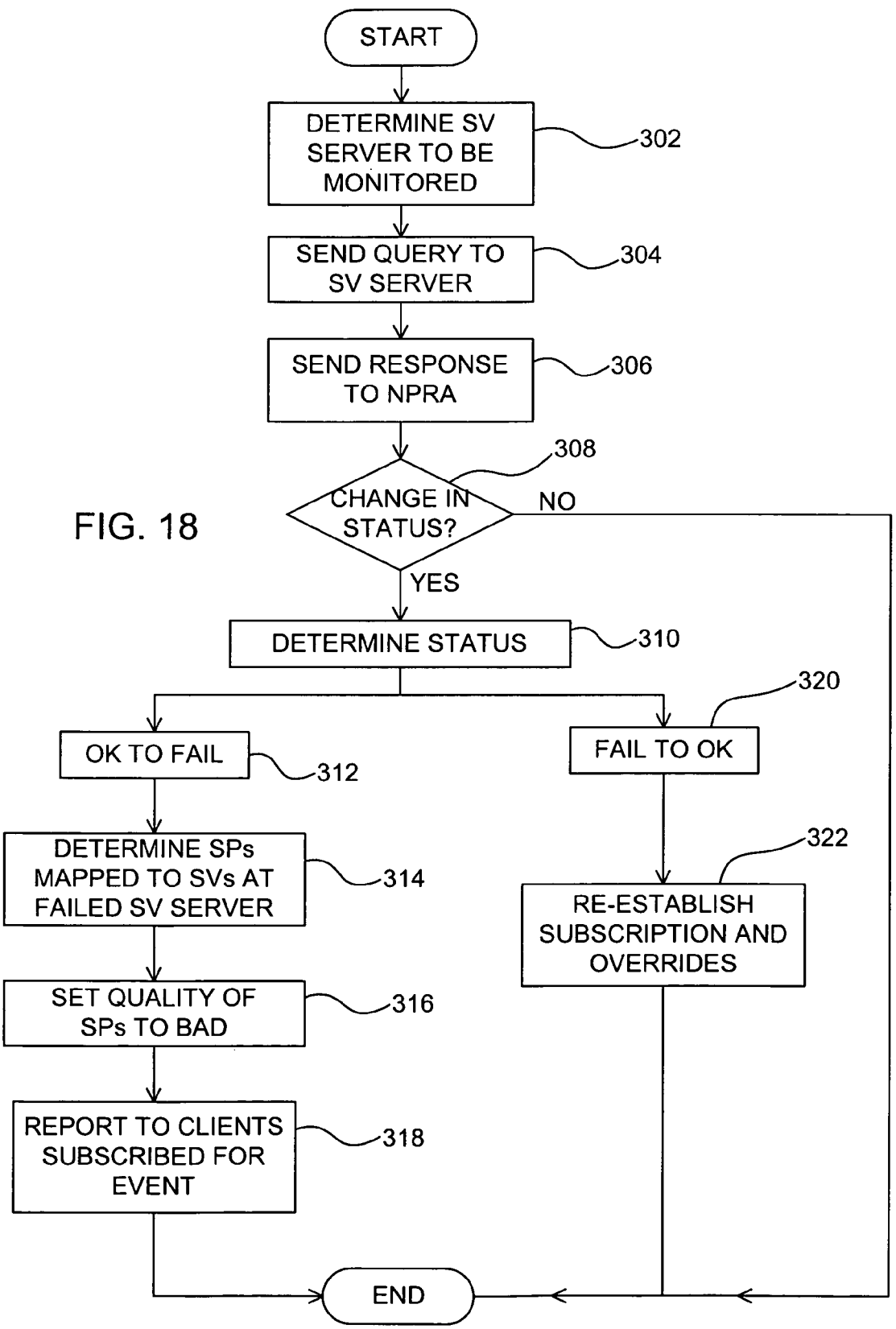
FIG. 18 is a flowchart illustrating the manner in which the NPRA monitors system variable (SV) servers that are connected to the NPRA via the control network; and, FIG. 19 is a flowchart illustrating the shutdown operation of the NPRA of the present system controller.

In addition to monitoring the network nodes, the NPRA 104 is also responsible for monitoring the status (health) of the SV servers 106 in the network 108 with which the NPRA communicates. If communication is lost with the SV server 106 residing at a remote node, the NPRA 104 needs to be informed, since it cannot communicate with that node, especially if the node contains SIs that are associated with Saps in the NPRA database 172. Referring to FIG. 18, after the startup of the NPRA 104 is completed (described above together with FIG. 10), the system application 162 queries the database manager 170 for a list of network nodes stored in the database 172, and then informs the server monitor 176 of the network nodes that contain the SV Server 106 that should be monitored or scanned (block 302). The server monitor 176 then starts scanning the network nodes on a periodic basis, for example, every 10 seconds, by sending an application status query message to the SV servers 106 on the remote network nodes (block 304). The queried SV server 106 responds by sending a reply message back to the server monitor 176 (block 306).

If the SV server's status is unchanged, the server monitor takes no further action with respect to that SV server 106 (block 308). If, however, it is determined (block 310 that the SV server's status has gone from OK to "failed," the server monitor 176 informs the subscription manager 166 that the SV server 106 has failed (block 312). The subscription manager 166 then queries the database manager 170 for all the Saps that have SIs at the failed SV server 106 (block 314), and invokes the database manager to set the "quality" of all the affected Saps to bad (block 316). After the database manager 170 updates the SP quality values in the database 172, the database manager 170 informs the subscription manager 166 that each of the Saps has experienced a change in quality. In response, the subscription manager 166 notifies all of the NPRA clients 102 that have subscribed for this type of event (block 318), as described above (see FIG. 15 and its corresponding description).

If the SV server's status has gone from "failed" to OK (block 320), the server monitor (176) informs the subscription manager 166 that the SV server 102 has returned from failure. The subscription manager 166 then invokes the transaction manager to reestablish any subscriptions and overrides (block 322).

Figure 19:
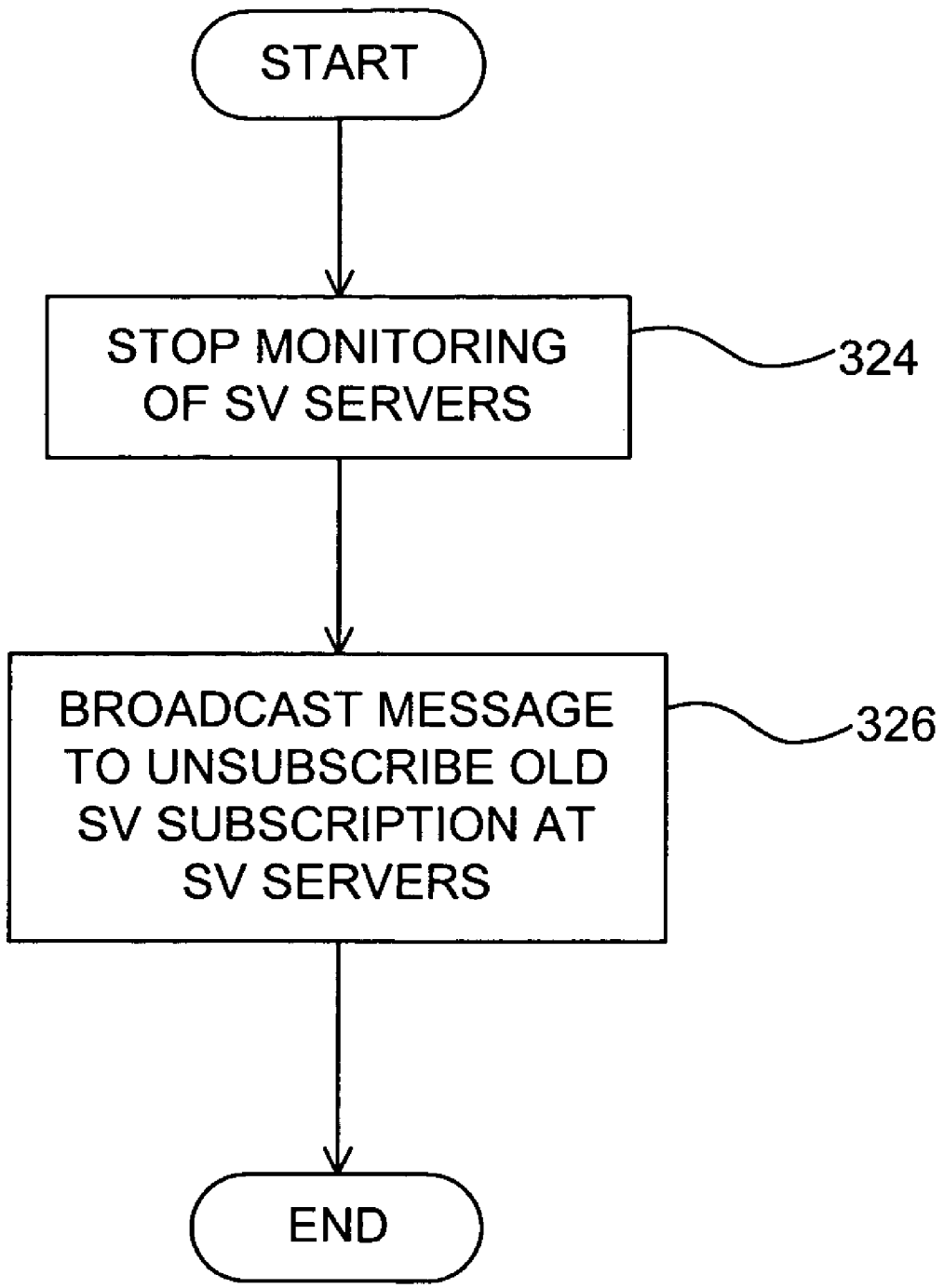

Turning now to FIG. 19, the shutdown process for the NPRA 104 occurs when the NPRA client 102 such as the workstation 118 commands the NPRA to stop running. When this command is received, the system application 162 informs the server monitor 176 to stop monitoring the SV servers 106 (block 324), and broadcasts a message to unsubscribe for any SV subscription with the SV servers 106 in the network 108 (block 326).

From the foregoing description, it should be understood that an improved system controller for a control network has been shown and described which has many desirable attributes and advantages. The system controller is adapted to be integrated with any standard control network, but employs proprietary communication that allows the system controller increase its control capabilities and expands functionalities. The proprietary communication is based on "system points" which are mapped to desired system or user-defined variables in the network and transmitted between the network point record application (NPRA) and the various applications in the network via a proprietary protocol.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the appended claims.

What is claimed is:

1. A control network comprising a system controller and a plurality of device controllers that communicate through the network via a network specific communication protocol for controlling a plurality of network devices, said system control network comprising:
   an application controller, provided in said system controller, connected to the network for selectively converting a plurality of system points corresponding to a plurality of system variables relating to the network into said corresponding system variables, and said corresponding system variables into said system points; and,
   at least one client connected to the network and in communication with said application controller, said client selectively sending a command and requesting a report relating to a select system point;
   wherein said application controller sends a command relating to a system variable corresponding to said select system point to the network responsive to said command from said client, and receives a report relating to said system variable corresponding to said select system point from the network, converts said received report to said report relating to said select system point and sends said converted report to said client responsive to said report request from said client; said communication between said at least one client and said application controller is via a system variable proprietary protocol of said system controller embedded in the communication protocol of the network, and wherein one or more of said device controllers have a server incorporated therein, said server from said one or more device controllers communicates with said application controller using a system point proprietary protocol also embedded in the communication protocol of the network.

2. The system controller as defined in claim 1 wherein said command and said report relating to said system variable corresponding to said select system point are transmitted via the communication protocol of the network.

3. The system controller as defined in claim 1 wherein said application controller is provided in one of the device controllers.

4. The system controller as defined in claim 1 wherein said at least one client is a workstation for performing predefined system control applications.

5. The system controller as defined in claim 1 wherein said command and said report relating to said system variable corresponding to said select system point are transmitted to and from said one of said servers via the communication protocol of the network.

6. The system controller as defined in claim 1 wherein each said server includes system application means for managing the startup and shutdown of said server, subscription managing means for tracking said at least one client that sent said command and said request relating to said select system point corresponding to said system variable of the device controller corresponding to said each server, and protocol server means for decoding said commands and said reports from said application controller.

7. The system controller as defined in claim 1 wherein each said server includes network interfacing means for allowing said each server to send and receive messages via the network protocol.

8. The system controller as defined in claim 6 wherein each said server includes memory means for storing information necessary to perform said command and prepare said report from and to said application controller.

9. The system controller as defined in claim 1 wherein characteristics of each of said system points are described in a plurality of predefined data fields.

10. The system controller as defined in claim 9 wherein said data fields of each said system point include a field for indicating a unique identifier of said system point; a field for storing a unique identification number of said corresponding system variable; and a field for storing a numeric value of said system point.

11. The system controller as defined in claim 9 wherein said application controller is adapted to convert engineering units associated with said system points into engineering units associated with said corresponding system variable, and said engineering units associated with said corresponding system variable to said engineering units associated with said system points.

12. The system controller as defined in claim 1 wherein said application controller includes system application means for managing the startup and shutdown of said application controller; and diagnostics managing means for obtaining diagnostics information relating to the device controllers.

13. The system controller as defined in claim 1 wherein said application controller includes at least one database for storing said system points;
   database managing means for managing storing of said system points in said database;
   point commanding means for managing updating of said system points in said database; and,
   data converting means for converting said system variables into said system points and said system points into said system variables.

14. The system controller as defined in claim 1 wherein said application controller further includes subscription managing means for managing said command and said request from said at least one client, and said command and said request to and from the network; point server means for generating said report requested by said at least one client; and controller server means for processing said command and said request transmitted between said application controller and the network.

15. The system controller as defined in claim 1 wherein said application controller further includes network monitoring means for monitoring whether the device controllers have failed and/or returned from a failure; and,
   server monitor means for monitoring a status of said servers corresponding to the device controllers.

16. The system controller as defined in claim 1 wherein said system controller is operatively interfaced with an internet.

17. The system controller as defined in claim 16 wherein said at least one client is a workstation for performing predefined system control applications and for establishing communications between said system controller and the internet.

18. The system controller as defined in claim 16 wherein one of the device controllers provides communication between said system controller and the internet.

19. A method of isolating control applications of a system controller integrated with a network employing a network specific communication protocol for communicating between a plurality of device controllers for controlling a plurality of network devices in a system, said method comprising the steps of:

establishing communication between at least one client for performing the control applications and an application controller, provided in said system controller, via a system variable proprietary protocol said first proprietary protocol embedded in the network specific communication protocol, operatively establishing a connection between said application controller and the network;

storing a plurality of system points which correspond to a plurality of system variables relating to the network devices in a memory operatively connected to said application controller;

obtaining data relating to a system variable on the network corresponding to a select system point requested by said at least one client, and converting said data relating to said select system variable to data relating to said select system point responsive to said request from said client; and, providing said client access to said converted data;

incorporating a server in one or more of said device controllers and using a system point proprietary protocol embedded in the network specific communication protocol to communicate between said application controller and said server in said one or more said device controllers.

20. The method as defined in claim 19 wherein said connection between said application controller and the network is via the network communication protocol.

21. The method as defined in claim 19 wherein the network communication protocol is used to communicate between said servers and said application controller.

22. The system controller as defined in claim 1, wherein said first proprietary protocol and said second proprietary protocol are incorporated into the explicit messages fields of said communication protocol of the network.

23. The method as defined in claim 1, wherein said first proprietary protocol and said second proprietary protocol are incorporated into the explicit messages fields of said communication protocol of the network.

* * * * *